US008248559B2

(12) United States Patent
Morita (10) Patent No.: US 8,248,559 B2
(45) Date of Patent: *Aug. 21, 2012

(54) LIQUID CRYSTAL DISPLAY DEVICE (75) Inventor: Shin Morita, Ishikawa-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 470 days.

This patent is subject to a terminal disclaimer.

(21) Appl. No.: 12/508,298

(22) Filed: Jul. 23, 2009

(65) Prior Publication Data

US 2010/0020277 A1 Jan. 28, 2010

(30) Foreign Application Priority Data

Jul. 25, 2008 (JP) ................................ P2008-192494

(51) Int. Cl.
G02F 1/1333 (2006.01)
G02F 1/1343 (2006.01)

(52) U.S. Cl. ........................................ 349/110; 349/139

(58) Field of Classification Search .......... 349/145–146, 349/110, 139
See application file for complete search history.

(56) References Cited

U.S. PATENT DOCUMENTS

| 7,253,865 B2 * | 8/2007 | Battersby ...................... 349/146 |
| 8,023,087 B2 * | 9/2011 | Yamamoto et al. ........... 349/143 |
| 2008/0018557 A1 * | 1/2008 | Maeda ............................ 345/55 |
| 2010/0141874 A1 * | 6/2010 | Morita .......................... 349/106 |

FOREIGN PATENT DOCUMENTS

JP 2006-276359 10/2006

OTHER PUBLICATIONS

U.S. Appl. No. 12/508,284, filed Jul. 23, 2009, Morita.
U.S. Appl. No. 12/649,772, filed Dec. 30, 2009, Morita.
U.S. Appl. No. 13/324,378, Dec. 13, 2011, Morita.

* cited by examiner

Primary Examiner — Dung T. Nguyen
(74) Attorney, Agent, or Firm — Oblon, Spivak, McClelland, Maier & Neustadt, L.L.P.

(57) ABSTRACT

A liquid crystal display device having a non-rectangular display panel includes an active area which is defined by a peripheral shield layer. A plurality of pixels are formed in the active area in a matrix, and each pixel includes a plurality of sub-pixels to display colors different from each other. A part of the sub-pixels of peripheral pixels located in a peripheral region of the active area is covered with a peripheral shield layer. Shield elements are arranged in the sub-pixels which are not covered with the peripheral shield layer so that an effective display area of each of the sub-pixels of the peripheral pixel is substantially equal.

13 Claims, 6 Drawing Sheets

LIQUID CRYSTAL DISPLAY DEVICE

CROSS-REFERENCE TO RELATED APPLICATION

This application is based upon and claims the benefit of priority from prior Japanese Patent Application No. 2008-192494 filed Jul. 25, 2008, the entire contents of which are incorporated herein by reference.

BACKGROUND OF THE INVENTION

1. Field of the Invention

The present invention relates to a liquid crystal display device having a variant-shaped panel such as a substantially elliptical or circular shape, in which a peripheral region of a liquid crystal display panel is covered with a shield layer.

2. Description of the Background Art

Liquid crystal display devices are widely used as display devices for various kinds of equipments such as personal computers, OA equipments, and TV sets because the display devices have many advantages such as lightness, compactness and low power consumption. In recent years, the liquid crystal display device has also been used in mobile terminal equipments such as a mobile phone, a car navigation device and a game player, and a meter panel for automobiles Accordingly, a variety of panel shapes corresponding to applications such as a circular or an elliptical shape have been desired, not limited to a conventional rectangular shape. For example, Japanese laid open patent application No. P2006-276359 discloses a liquid crystal display device having a display panel formed in a substantially circular or elliptical shape. Particularly, corner portions of respective array and color filter substrates that have a vertical long and rectangular shape, are cut down close to a display area to save a display space in the Japanese laid open patent application.

On the other hand, in a color liquid crystal display device composed of pixels, each pixel includes, for example, red, green and blue sub-pixels. When a part of the sub-pixels composing the pixels is shielded, for example, by a housing, a displayed color of the pixels may be off-balance, which may result in a color display different from a predetermined one. For example, when only a part of the red sub-pixel is shielded, a transmittance or a reflection of the red color is reduced, which results in a difficulty of a display with a desired color balance. In order to suppress such color shift, one idea is to shield all the sub-pixels covered with the shield layer, such as for example by means of a black matrix layer. However, this idea has a drawback that the active area is reduced by the shield. Further, since edges of the active area are formed of dot patterns, smoothness of the edges of the active area in the circular or elliptical shape becomes impaired, which results in a bad image display.

BRIEF SUMMARY OF THE INVENTION

The present invention has been made to address the above mentioned problems.

Thus, according to one aspect of the invention, there is provided a liquid crystal display device including: a first substrate including wiring regions; a second substrate facing the first substrate; a liquid crystal layer interposed between the first and second substrates; a peripheral shield layer defining an active area formed of the first and second substrates and the liquid crystal layer in a non-rectangular shape to display images; a plurality of pixels formed in the active area, the pixels being arranged in a matrix and each pixel including a plurality of sub-pixels to display colors different from each other, the pixels including peripheral pixels located in a peripheral region of the active area, and wherein effective display areas of the sub-pixels in the peripheral pixels, in which at least one of the sub-pixels is covered with the peripheral shield layer, are substantially equal.

According to another aspect of the invention, there is provided a liquid crystal display device including: a first substrate including wiring regions; a second substrate facing the first substrate; a liquid crystal layer interposed therebetween between the first and second substrates; a peripheral shield layer defining an active area formed of the first and second substrates and the liquid crystal layer in a non-rectangular shape to display images; a plurality of pixels formed in the active area, the pixels being arranged in a matrix and each pixel including plural sub-pixels to display colors different from each other; the pixels including peripheral pixels arranged in a peripheral region of the active area so as to overlap with the peripheral shield layer; and wherein a shield element is arranged in each of the sub-pixels of all the pixels in the active area.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF PREFERRED EMBODIMENTS

A liquid crystal display devise according to an exemplary embodiment of the present invention, in particular, a liquid crystal display device having a variant-shaped panel such as a substantially elliptical or circular shape, in which a peripheral region of the liquid crystal display panel is covered with a shield layer, will now be described with reference to the accompanying drawings wherein the same or like reference numerals designate the same or corresponding parts throughout the several views.

Figure 1:
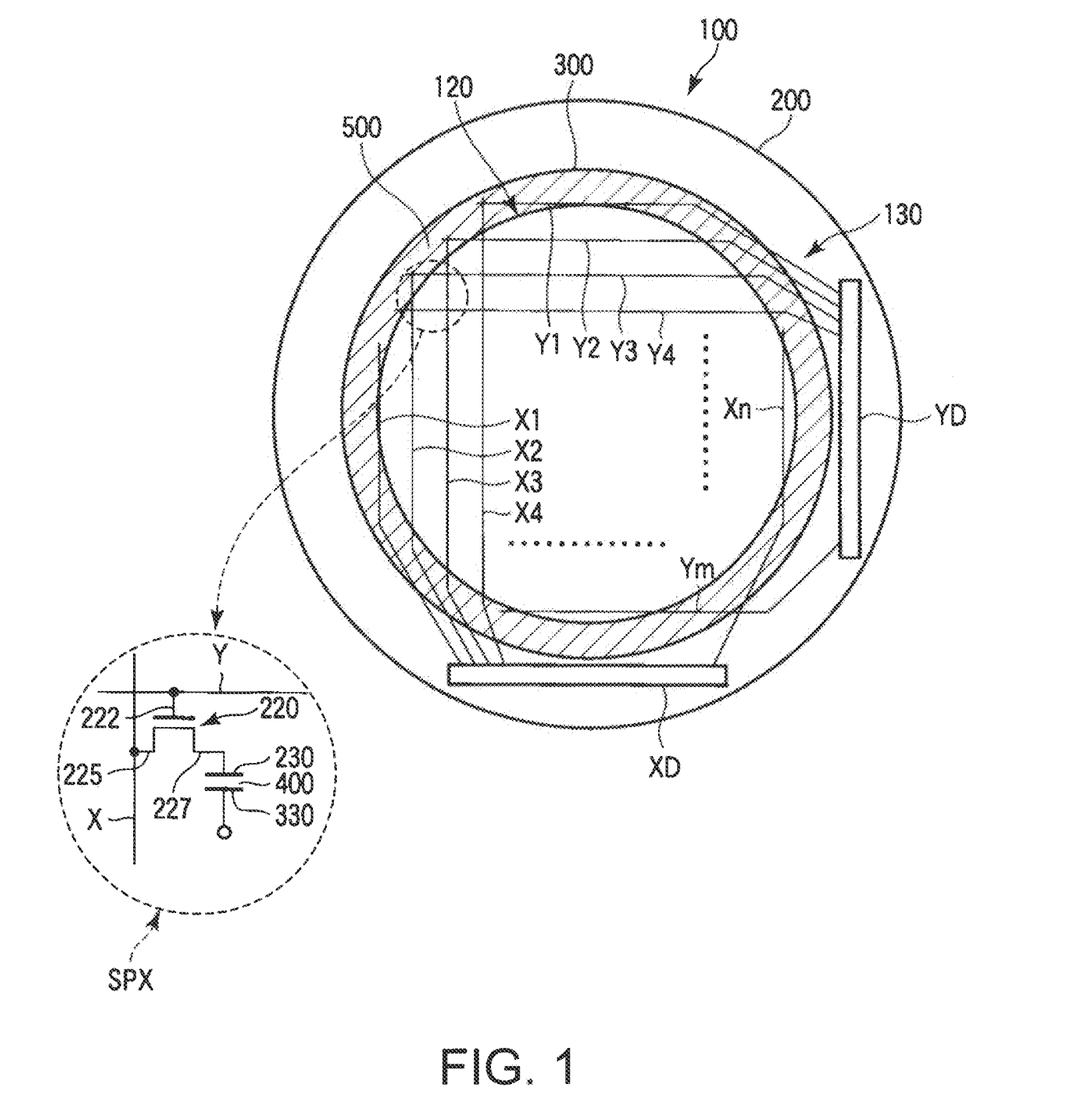
FIG. 1 is a schematic block diagram showing a liquid crystal panel of a liquid crystal display device according to a first embodiment of the invention.
Figure 2:
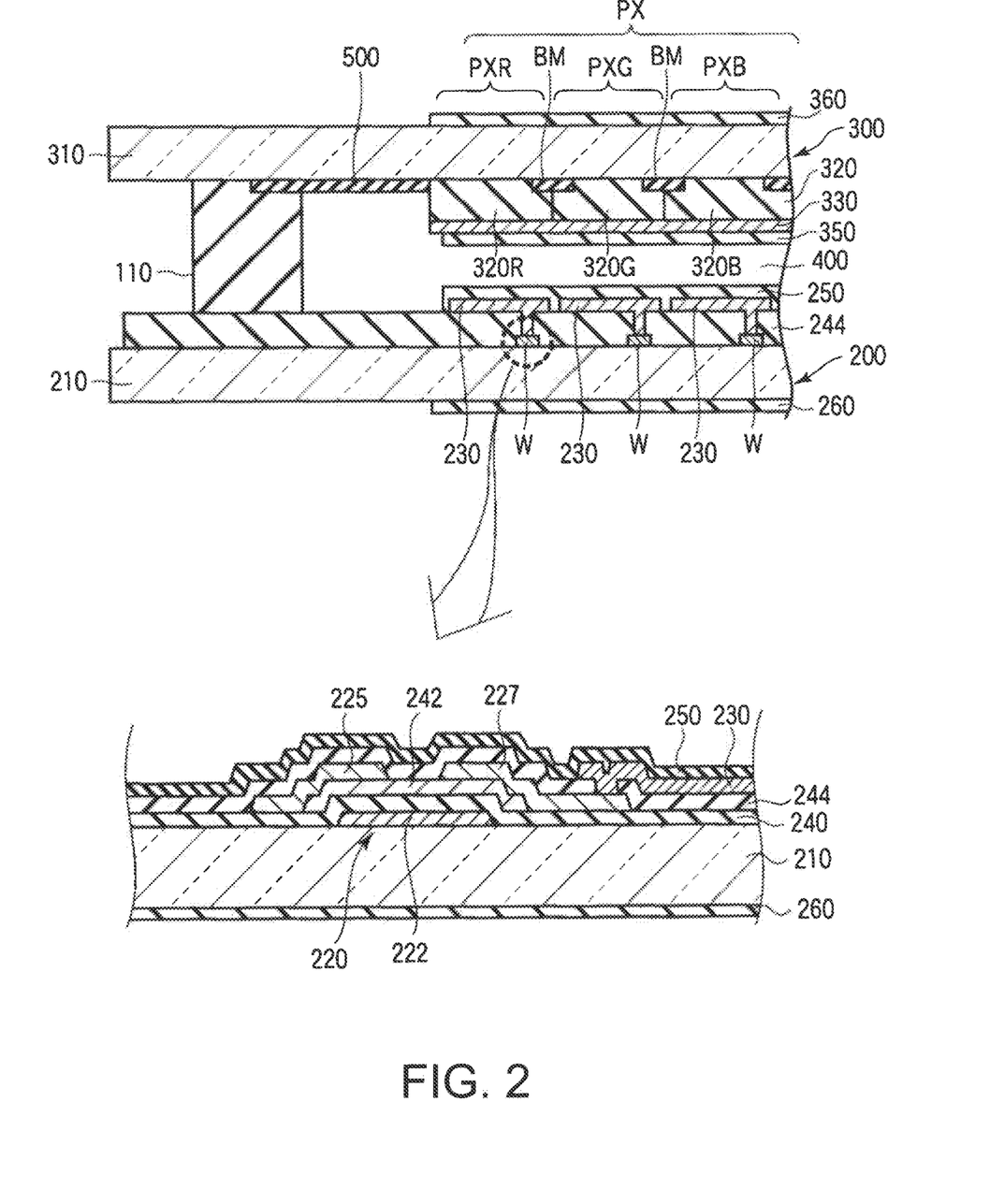
FIG. 2 is a cross-sectional view showing the liquid crystal display device shown in FIG. 1 according to the first embodiment of the invention.

As shown in FIGS. 1 and 2, a liquid crystal display device according to the invention includes a liquid crystal display panel 100. The liquid crystal display panel 100 is composed of a pair of substrates, e.g., an array substrate 200 (first substrate), and a counter substrate 300 (second substrate) and a liquid crystal layer 400 interposed therebetween. The liquid crystal display panel 100 includes an active area 120 in a variant shape.

In this embodiment, the liquid crystal display panel 100 includes a substantially circular shaped active area 120. That is, the liquid crystal display panel 100 is substantially circularly shaped, and the array substrate 200 and the counter substrate 300 that form the liquid crystal display panel 100 are also substantially circularly shaped. The array substrate 200 and the counter substrate 300 are attached by a seal element 110 and maintain a predetermined gap to hold the liquid crystal layer 400 therebetween. The liquid crystal layer 400 is formed of liquid crystal molecules injected into the gap. The active area 120 is located inside of the sealed portion by the seal element 110. In this embodiment, the active area 120 is composed of a plurality of pixels. Particularly, there is provided a color liquid crystal display device, in which each pixel is formed of a plurality of sub-pixels PXR. For example, each pixel PX is formed of red sub-pixel PXR, green sub-pixel PXG and blue sub-pixel PXB.

The array substrate 200 is formed of a circular shaped insulating substrate 210 such as a glass substrate with transmissive characteristic. The array substrate 200 includes a plurality of gate lines Y (1, 2, 3, . . . , m) extending in a row direction of the pixels arranged in a matrix, a plurality of source lines X (1, 2, 3, . . . , n) extending in a column direction of the pixels arranged in a matrix, switching elements 220 located at crossing intersections crossing between the source and gate lines, and picture electrodes arranged in each of the pixels PX in the active area 120.

The gate lines Y are located on the insulating substrate 210 and the source lines X are arranged so as to cross with the gate lines Y with an interposed gate insulating layer 240. The gate lines Y and the source lines X are made of conductive material such as Molybdenum (Mo), Tungsten (W) and Aluminum (Al).

Each of the gate lines Y in the active area 120 is extracted to a peripheral portion 130 and is connected to a gate driver YD as a signal source. Each of source lines X is also extracted to the peripheral portion and is connected to a source driver XD as a signal source. The switching element 220 is, for example, formed of a thin film transistor (TFT). A gate electrode 222 of the switching element 220 is arranged on the insulating substrate 210 with the gate line Y, and is connected to the gate line Y (or the gate electrode 222 is integrally formed with the gate line Y). The gate line Y and the gate electrode 222 are covered with a gate insulating layer 240, which is, for example, made of silicon nitride ($Si_3N_4$).

A semiconductor layer 242 of the switching element 220 is arranged on the gate insulating layer 240 facing the gate electrode 222. The semiconductor layer 242 is, for example, made of amorphous silicon or poly-silicon. Source electrode 225 and drain electrode 224 are arranged on the gate insulating layer 240 with the source line X. The source electrode 225 is connected to the source line X or is integrally formed of the source line X, and contacts with the semiconductor layer 242. The drain electrode 227 is connected to the pixel electrode 230 and contacts with the semiconductor layer 242. The source electrode 225 and the drain electrode 224 may be manufactured by the same process and the same material, and are covered with a passivation layer 244 such as silicon nitride ($Si_3N_4$) layer. The picture electrode 230 is arranged on the passivation layer 244 facing the pixel PX. The picture electrode 230 is connected to the drain electrode 227 of the switching element 220 through a contact hole formed in the passivation film 244.

In a transmission mode liquid crystal display panel, in which a picture is displayed by selectively transmitting light from a backlight unit provided at a rear side of the liquid crystal display panel, the picture electrode 230 is made of conductive and transmissive material such as Indium Tin Oxide (ITO) and Indium Zinc Oxide (IZO). On the other hand, in a reflective mode liquid crystal display panel, in which a picture is displayed by selectively reflecting light that penetrates from outside, the picture electrode 230 is made of reflective material such as Aluminum (Al) and Molybdenum (Mo).

The surface of the array substrate 200 is covered with an alignment film 250 to control an alignment of liquid crystal molecules contained in the liquid crystal layer 400. The counter substrate 300 is formed of an insulating substrate 310 with a substantially circular shape and transmissive characteristic such as a glass substrate. The counter substrate 300 includes a black matrix BM facing wiring regions W such as the gate lines, source lines X and switching elements 220, and a color filter layer 320 arranged so as to face sub-pixels in the active area 120.

A black matrix BM that is made of a black colored resin film is formed on the insulating counter substrate 310 in a matrix shape. The black matrix BM is formed of a black colored resign or a metallic layer having light blocking characteristic such as chromium Cr. The color filter layer 320 is arranged in an effective region surrounded by the black matrix BM. The color filter layer 320 is composed of three types of colored resins such as red color resin (R), green colored resin (G) and blue colored resin (B). A red color filter layer 320R is arranged in the red color sub-pixel PXR so as to transmit red color. A green color filter layer 320G is arranged in the green color sub-pixel so as to transmit the green color. Similarly, a blue color filter layer 320B is arranged in the blue color sub-pixel PXB so as to transmit the green color. The color filter layers (R, G, B) may be formed on the array substrate 200.

The counter substrate 300 includes a peripheral shield layer 500 arranged in a peripheral region in the active area. The peripheral shield layer 500 is, for example, formed of a black colored resin and may be formed of the same material and the same process as the black matrix BM.

A common electrode 330 to supply a voltage difference to the liquid crystal display layer 400 between the picture electrode 230 may be formed on the counter substrate 300 or the array substrate 200. The common electrode 330 is made of conductive material with a transmissive characteristic such as ITO.

In the embodiment shown in FIG. 2, a vertical mode in which a vertical electric field, e.g., an electric field that is vertical with reference to the main surface of the substrate, is used. The common electrode 330 is commonly arranged on the common substrate 300 so as to face a plurality of picture electrodes 230 with the liquid crystal layer 400 interposed therebetween. Further, in a lateral electric mode, in which an electric field that is in parallel with the main surface of the substrate is used to control a switch operation of the liquid crystal layer 400, the common electrode 330 is arranged on the same array substrate 200 and isolated from the picture electrode 230 so as to laterally face the picture electrode 230.

The surface of the counter substrate 300 is covered with an alignment film 350 to control the alignment of the molecules contained in the liquid crystal layer 400. In the reflective mode liquid crystal display panel 100, an optical elements 360 is provided on the outer surface of the counter substrate 300. On the other hand, in the transmissive mode liquid crystal display device, optical elements 260 and 360 are arranged on the array substrate 200 and the counter substrate 300, respectively. The optical elements 260 and 360 include polarizers in which a polarizing direction is set so as to fit the characteristic of the liquid crystal layer 400. A retardation film may be used, as needed.

In the liquid crystal display device including the transmissive mode liquid crystal display panel 100, a back light unit is provided at the rear side of the liquid crystal display panel 100 to illuminate the display panel 100.

According to the invention, pixels PX located at a peripheral portion of the active area 120 that is formed in a substantially circular shape is partially covered with a peripheral shield layer 500. That is, when at least one of the three sub-pixels in the pixels PX is covered with the shield layer 500, each effective display area of the three sub-pixels, e.g., red sub-pixel PXR, green sub-pixel PXG and blue sub-pixel PXB, is designed to be substantially equal. Of course, in the case pixels are not covered with the peripheral shield layer 500, the effective display area of each of three sub-pixels is equal. Here, the effective display areas of the sub-pixels correspond to areas which effectively contribute to the display. In the transmissive mode liquid crystal display panel, the effective display area corresponds to the area where light from a back light unit is transmitted. On the other hand, in the reflective mode liquid crystal display panel, the effective display area corresponds to the area where penetrating light from outside to the panel is reflected. According to such construction, it becomes possible to maintain a color balance in even peripheral pixels PX as well as other inner pixels of the circular display panel. That is, even if only one sub-pixel in one peripheral pixel X is shielded by the peripheral shield layer 500, all the sub-pixels including the remaining sub-pixels SPX in the peripheral pixel PXP are configured to have equal display areas, respectively, which results in a color display with a predetermined color balance. Accordingly, a high quality liquid crystal display device having a good color balance in the entire panel, including the peripheral region, can be obtained.

Since the peripheral pixels PX contribute to the display of the active area 120, the effective active area is not reduced compared with a case where all the peripheral pixels shielded by the peripheral shield layer 500 are shielded. Further, the edge portion of the active area 120 formed of the peripheral pixels becomes smooth, which results in improvement of the display quality.

Particularly, when the active area 120 in a substantially circular or elliptical shape is formed, the edge portion of the active area 120 has a round shape. Even in such case, it becomes possible to make the edge portion of the active area 120 smooth. Thus, some variations of shapes of active area 120 with a high quality display can be obtained corresponding to applications.

Figure 3:
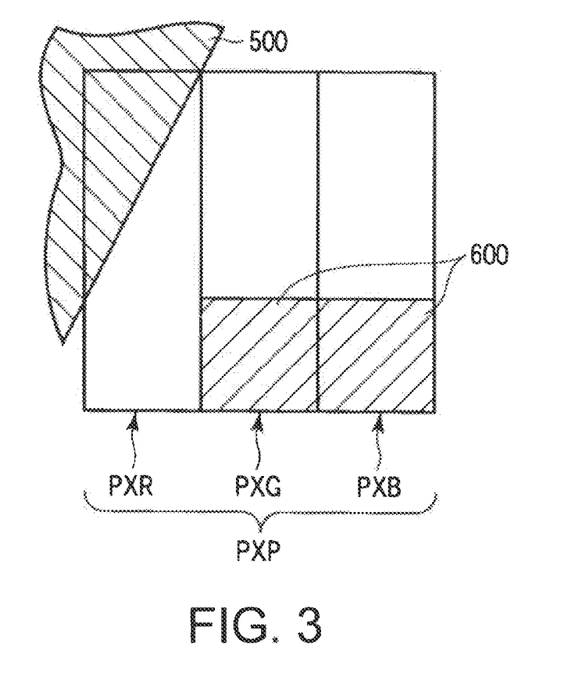
FIG. 3 is a plan view showing a structure of a peripheral pixel shown in FIG. 1 according to the first embodiment of the invention.

Hereinafter, a first embodiment will be described with reference to FIG. 3. In this embodiment, a sub-pixel which constructs the peripheral pixel PX includes a shield element so as to partially shield the sub-pixel. For example, when the peripheral shield layer 500 overlaps with a part of the red sub-pixel PXR in a peripheral pixel PX, the effective display area of the red sub-pixel PXR becomes smaller than other sub-pixels, e.g., green and blue sub-pixels. Shield elements 600 are arranged on the green sub-pixel PXG and the blue sub-pixel PXB, respectively so as to eliminate the difference of the display area among the sub-pixels as shown in FIG. 3. That is, an area shielded by the peripheral shield layer 500 in the red sub-pixel PXR is almost equal to the areas shielded by a shield element 600 in the green sub-pixel PXG and the blue sub-pixel PXB, respectively.

Figure 4:
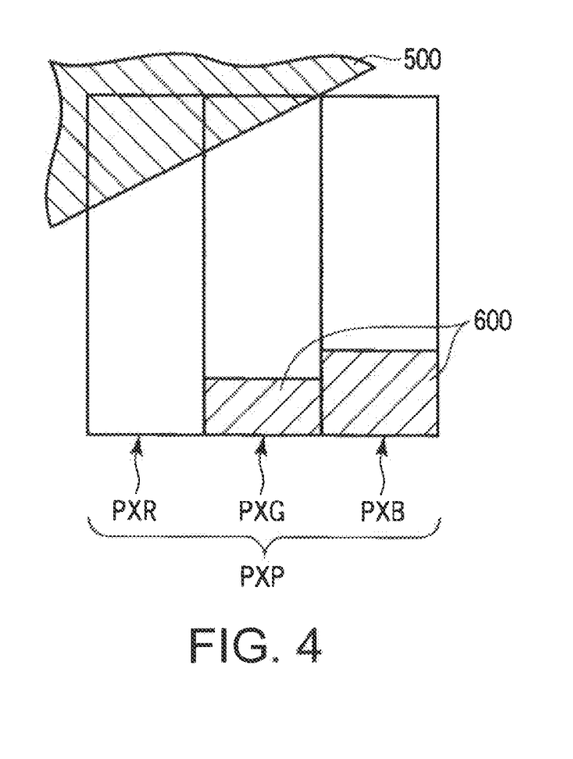
FIG. 4 is a plan view showing another structure of the peripheral pixel shown in FIG. 1 according to the first embodiment of the invention.

When parts of the red sub-pixel PXR and the green sub-pixel PXG are shielded by the peripheral shield layer 500 as shown in FIG. 4, each of the display areas of the red sub-pixel PXR and the green sub-pixel PXG becomes smaller than the blue sub-pixel PXB. In this embodiment, the shielded area covered by the peripheral shield layer 500 in the red color sub-pixel PXR is larger than that of the green sub-pixel PXG. Shield elements 600 are arranged on the green sub-pixel PXG and the blue sub-pixel PXB, respectively so as to eliminate the difference of the display areas among the sub-pixels. The area of the shield element 600 which covers the green sub-pixel PXG is smaller than that of the blue sub-pixel PXB. That is, the area shielded by the peripheral shield layer 500 in the red sub-pixel PXR is substantially equal to the areas shielded by the peripheral shield layer 500 and the shield element 600 in the green sub-pixel PXG, and the area shielded by the shield element 600 in the blue sub-pixel PXB, respectively.

According to above first embodiment, the peripheral pixels PX contribute to the display, and it becomes possible to maintain the color balance of the peripheral pixels PXP in an optimum condition. Therefore, a high quality liquid crystal display device having a non-rectangular shaped panel can be provided without reducing in the effective active area.

Figure 5:
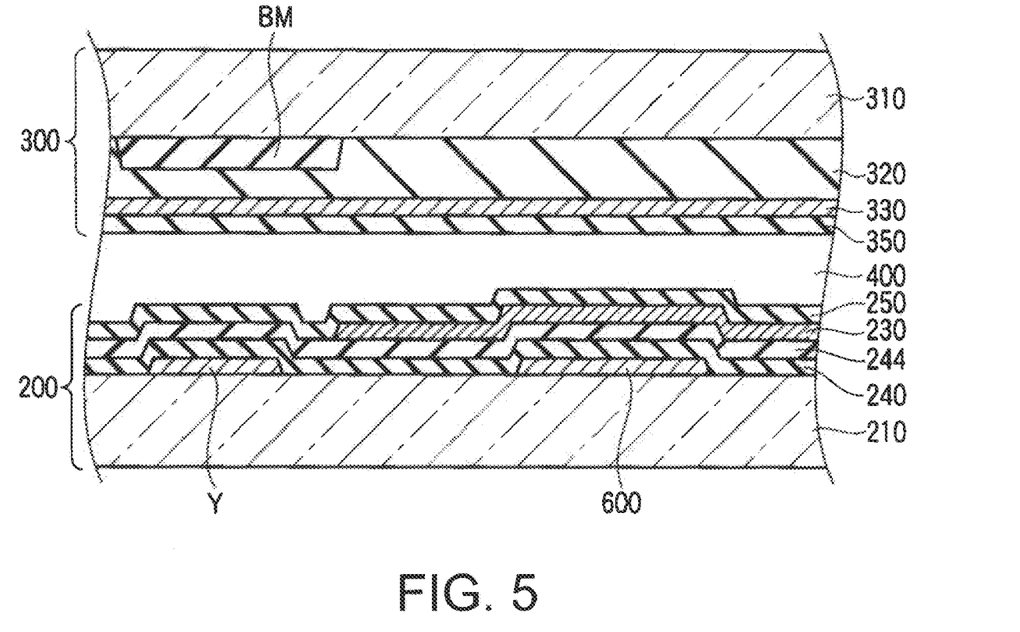
FIG. 5 is a cross-sectional view showing a structure of a shield layer applied to peripheral pixels according to the first embodiment.

The shield element 600 may be arranged on the array substrate 200 or the counter substrate 300 as shown in FIG. 5. For example, when the shield element 600 is arranged on the array substrate 200, the shield element 600 may be formed of the same material as wiring regions W. The shield element 600 is made of the same material as the gate line Y using the same patterning process. The wiring regions W such as the gate lines Y are formed of non-transparent conductive materials as mentioned above and function as a shield layer. The shield element 600 may be arranged in an island shape or be formed by locally expanding the width of the wiring region in the sub-pixels.

Figure 6:
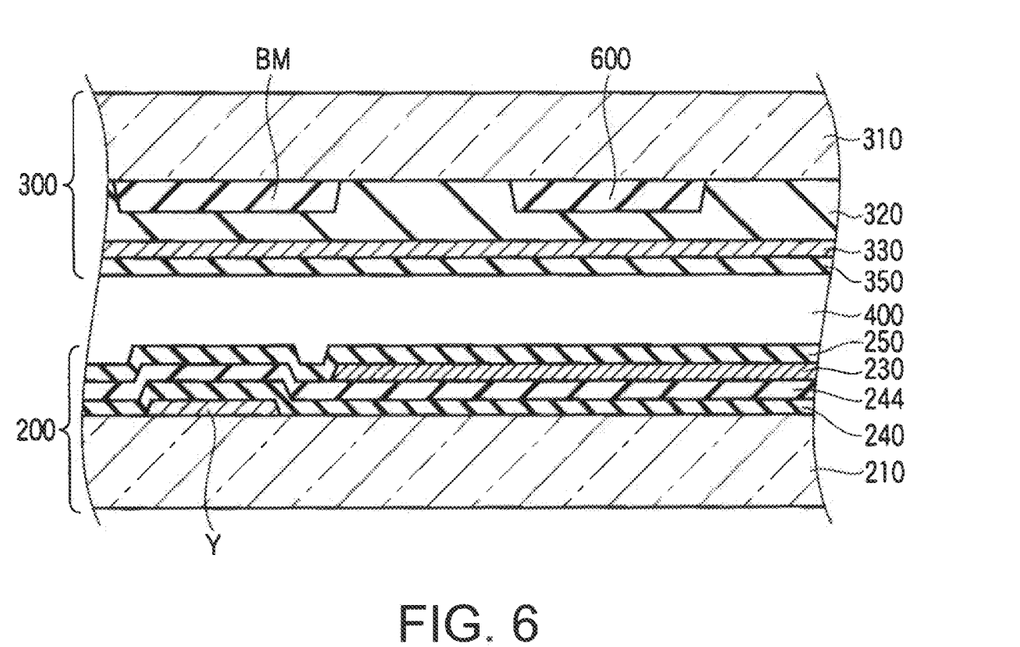
FIG. 6 is a cross-sectional view showing other structure of a shield layer applied to the peripheral pixels according to the first embodiment.

When the shield element 600 is arranged on the counter substrate 300 as shown in FIG. 6, the shield element 600 may be formed of the same material as the peripheral shield layer 500. The shield element 600 may be arranged in an island shape or be formed by locally expanding the width of the black matrix BM in the pixels. When the shield element 600 is arranged on the array substrate 200, the shield element 600 is located closer to the insulating substrate 210 than the picture electrode 230, therefore, this arrangement is suitable to the transmissive mode liquid crystal display panel. On the other hand, when the shield element 600 is arranged on the counter substrate 300, the arrangement can be applied to both the transmissive mode and the reflective mode liquid crystal display panels because the transparency of the picture electrode is not needed.

Figure 7:
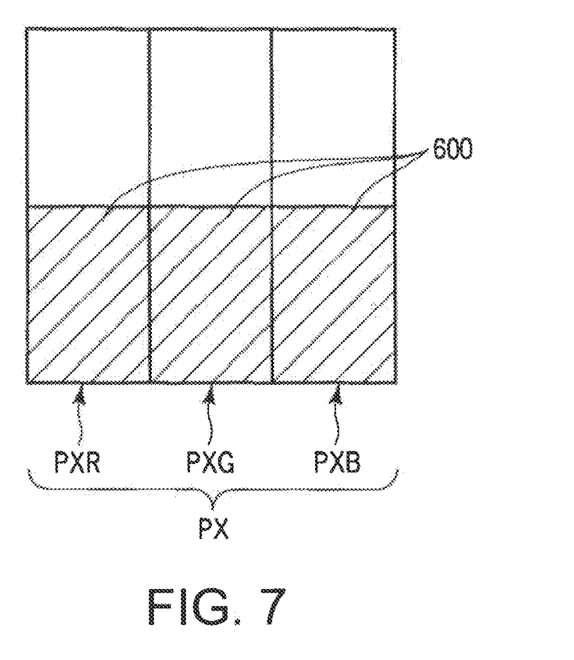
FIG. 7 is a plan view showing a structure of internal pixels shown in FIG. 1 according to a second embodiment of the invention.
Figure 8:
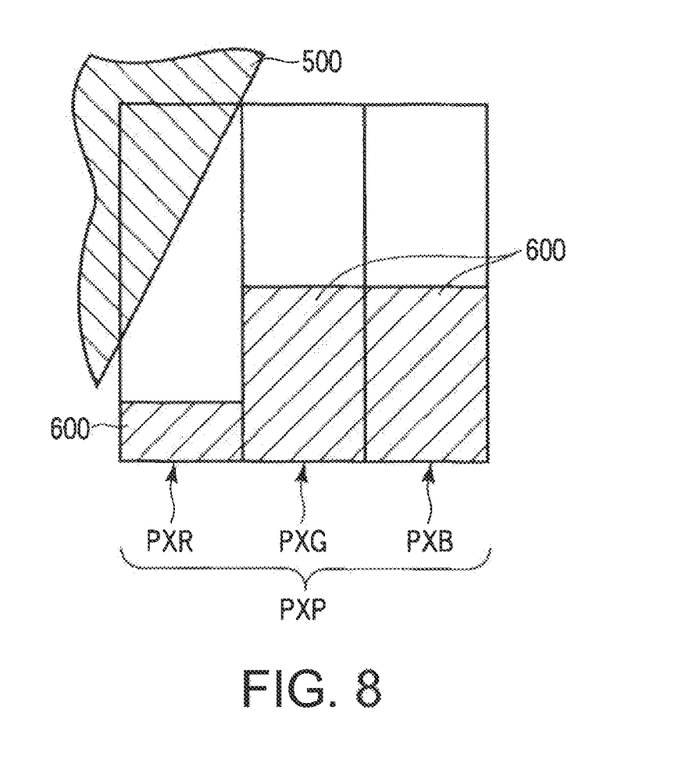
FIG. 8 is a plan view showing a structure of a peripheral pixel shown in FIG. 1 according to the second embodiment of the invention.
Figure 9:
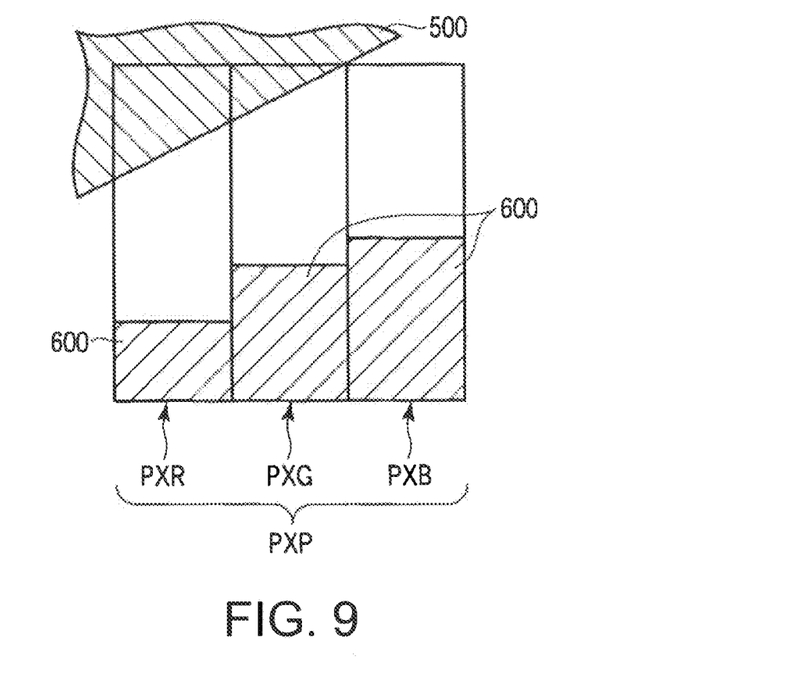
FIG. 9 is a plan view showing other structure of a peripheral pixel shown in FIG. 1 according to the second embodiment of the invention.

FIG. 7 to FIG. 9 show a second embodiment according to the invention. In this embodiment, each of all pixels PX composing the active area 120, not limited to the peripheral pixels PX, includes shield elements so as to cover a part of each pixel PX, respectively. For example, the shield element 600 is arranged even in pixels in which the peripheral shield layer 500 is not covered as shown in FIG. 7. In more detail, the shield element 600 is provided in the red sub-pixel PXR, green sub-pixel PXG and blue sub-pixel PXB in the all pixies arranged in the active area 120 including inner pixels PX surrounded by the peripheral pixels PX. In this embodiment, the shield element 600 is designed so that the effective display area becomes about 50% of each of the sub-pixels in the all pixels in the active area 120. That is, at the first step of design, the shield element 600 is arranged in advance on the all pixels PX in the active area 120. Almost equal display area of each pixel PX is intentionally shielded by the shield element and the display area of each pixel is reduced for the entire area of the active area 120. Next, in sub-pixels where the peripheral shield layer 500 is covered, the area of the shield element 600 is reduced from the predetermined value (50%) so as to make the effective display areas of the all pixels equal.

As shown in FIG. 8, when the peripheral shield layer 500 covers only a part of the red sub-pixel PXR of the peripheral pixels PX, the display area of the red sub-pixel PXR becomes smaller than those of other sub-pixels e.g., the green sub-pixel PXG and the blue sub-pixel PXB, if the shield element 600 with the same area covers the red sub-pixel PXR, green sub-pixel PXG and blue sub-pixel PXB. Therefore, the shield element 600 having a smaller area is arranged on the red color sub-pixel PXR, compared to the green sub-pixel PXG and the blue sub-pixel PXB so as to make the effective display area of the red color sub-pixel PXR, green sub-pixel PXG and blue sub-pixel PXB equal. According to this arrangement, any difference in display area among the sub-pixels is eliminated. That is, the area shielded by the shield element 600 in the red sub-pixel PXR is smaller than those of the green sub-pixel PXG and the blue sub-pixel PXB. The area shielded by the peripheral shield layer 500 and the shield element 600 in the red sub-pixel PXR is equal to those shielded by the shield element 600 in the green sub-pixel PXG and the blue sub-pixel PXB, and is also equal to all sub-pixels in the inner pixels surrounded by the peripheral pixels.

As shown in FIG. 9, when the peripheral shield layer 500 covers parts of the red sub-pixel PXR and the green sub-pixel PXG, the effective display areas of the red and green sub-pixels PXR, PXG become smaller than that of the blue sub-pixel PXB. In this embodiment, the area shielded by the peripheral shield layer 500 in the red sub-pixel PXR is larger than that in the green sub-pixel PXG. The shield element 600 is arranged in red sub-pixel, green sub-pixel PXG and blue sub-pixel PXB so as to eliminate differences in the display area among the sub-pixels. The shielded area covered by the shield element 600 in the red sub-pixel PXR is smaller than those in the green sub-pixel PXG and the blue sub-pixel PXB. Further, the shielded area covered by the shield element 600 in the green sub-pixel PXG is smaller than that in the blue sub-pixel PXB. That is, the areas shielded by the peripheral shield layer 500 and the shield element 600 in the red sub-pixel PXR and in the green sub-pixel PXG are the same as that shielded by the shield element 600 in the blue sub-pixel PXB.

According to above-mentioned second embodiment, the same effect as the first embodiment can be obtained. It becomes possible to maintain the color balance of the peripheral pixels PXP in an optimum condition having a non-rectangular shaped panel without reducing in the effective active area. Therefore, a high quality liquid crystal display device can be provided. Further, a uniform brightness for entire display panel can be obtained by arranging the shied elements to all pixels.

In the second embodiment, the shield element 600 may be arranged on the array substrate 200 or be arranged on the counter substrate 300. That is, the shield element 600 may be formed of the same materials as the wiring regions W or the peripheral shield layer 500.

Figure 10:
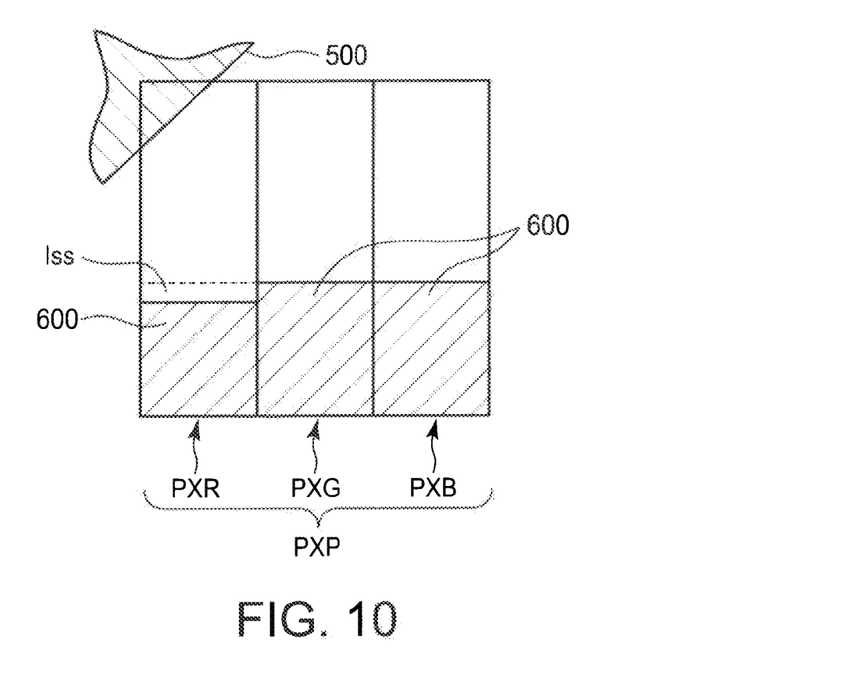
FIG. 10 is a plan view showing a structure of a peripheral pixel shown in FIG. 1 according to a third embodiment of the invention.

FIG. 10 shows a third embodiment in which a change of brightness from the peripheral pixels to the internal pixels is gradual. In the second embodiment, each pixel PX composing the active area 120, not limited to the peripheral pixels PX, includes shield elements 600 so as to cover a part of the pixels PX, respectively. However, in the third embodiment, only pixels arranged in the peripheral region of the active area are covered with the shield elements 600. That is, the internal pixels are not covered with the shield elements 600. In more detail, the shield element 600 is provided in red sub-pixel PXR, green sub-pixel PXG and blue sub-pixel PXB in the peripheral pixels PX. In this embodiment, the shield elements 600 are formed so that the effective display areas becomes about 50% of each of the sub-pixels in the peripheral pixels PX. Display areas of the intentionally shielded sub-pixels are almost equal, and the effective display area of each sub-pixel in the peripheral pixels is reduced. According to this embodiment, the sub-pixels, e.g., red, green and blue sub-pixels of each peripheral pixel are shielded in a predetermined amount even if the peripheral shield layer 500 slightly overlaps with the red sub-pixel PXR. A small area Iss corresponds to an area shielded by the peripheral shield layer 500. Therefore, the brightness of all the pixels arranged in the peripheral region is darker than that of the internal pixels. The area where the peripheral shield layer 500 covers the pixels arranged at the location where horizontal and vertical lines cross with the circular line of the edge in the panel is very small, as shown in FIG. 10. Accordingly, there are dispersions of the brightness among the pixels arranged in the peripheral region depending on the location, that is, the shielded area. However, in this embodiment, the dispersion is not remarkable because the brightness of all the pixels arranged in the peripheral region is set darker than that of the internal pixels.

According to the present invention, the peripheral pixels in the active area contribute to the display, and it becomes possible to maintain the color balance of the peripheral pixel in an optimum condition. Therefore, a high quality liquid crystal display device having a non-rectangular shaped panel can be provided without reducing in the effective active area. The liquid crystal display device can be applicable to many equipments such as a meter panel for automobiles.

The present invention is not limited directly to the above described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined. It is to therefore be understand that within the scope of the appended claims, the present invention may be practiced other than as specifically disclosed herein.

What is claimed is:

1. A liquid crystal display device comprising:
a first substrate including wiring regions;
a second substrate facing the first substrate;
a liquid crystal layer interposed between the first and second substrates;
a peripheral shield layer defining an active area formed of the first and second substrates and the liquid crystal layer in a non-rectangular shape to display images;
a plurality of pixels formed in the active area, the pixels being arranged in a matrix and each pixel including a plurality of sub-pixels to display colors different from each other; and
peripheral pixels located in a peripheral region of the active area, and
wherein effective display areas of the sub-pixels in the peripheral pixels, in which at least one of the sub-pixels of at least one of the pixels is covered with the peripheral shield layer, are substantially equal.

2. The liquid crystal display device according to claim 1, wherein the active area is formed in a substantially circular or elliptical shape.

3. The liquid crystal display device according to claim 1, wherein at least one of the sub-pixels in the peripheral pixels includes a shield element to cover a part of the sub-pixel.

4. The liquid crystal display device according to claim 3, wherein each of the pixels includes first and second sub-pixels, and
wherein the peripheral shield layer partially overlaps with the first sub-pixel, and the shield element is arranged in the second sub-pixel so that an effective display area of the second sub-pixel is substantially equal to that of the first sub-pixel in the peripheral pixels.

5. The liquid crystal display device according to claim 4, wherein the shielded area covered with the peripheral shield layer in the first sub-pixel is substantially equal to that shielded by the shield element in the second sub-pixel.

6. The liquid crystal display device according to claim 3, wherein the shield element is formed on the first substrate using the same material as a wiring region.

7. The liquid crystal display device according to claim 3, wherein the shield element is formed on the second substrate using the same material as the peripheral shield layer.

8. A liquid crystal display device comprising:
a first substrate including wiring regions;
a second substrate facing the first substrate;
a liquid crystal layer interposed between the first and second substrates;
a peripheral shield layer defining an active area formed of the first and second substrates and the liquid crystal layer in a non-rectangular shape to display images;
a plurality of pixels formed in the active area, the pixels being arranged in a matrix and each pixel including first, second and third sub-pixels to display colors different from each other;
peripheral pixels arranged in a peripheral region of the active area so as to overlap with the peripheral shield layer; and
wherein the first and second sub-pixels in a peripheral pixel are shielded by the peripheral shield layer, and shield elements are arranged in the second and third sub-pixels of said peripheral pixel so that each effective display area of the first, second and third sub-pixels is substantially equal.

9. The liquid crystal display device according to claim 8, wherein the active area is formed in a substantially circular or elliptical shape.

10. The liquid crystal display device according to claim 8, wherein the first, second and third sub-pixels are red, green and blue color sub-pixels.

11. The liquid crystal display device according to claim 8, wherein the shield element is formed on the first substrate using the same material as a wiring region.

12. The liquid crystal display device according to claim 8, wherein the shield element is formed on the second substrate using the same material as the peripheral shield layer.

13. The liquid crystal display device according to claim 8, wherein the shielded area covered with the peripheral shield layer in the second sub-pixel is smaller than that in the first sub-pixel, and the shielded area covered with the shield element in the third sub-pixel is larger than that in the second sub-pixel.

* * * * *